United States Patent
Cao et al.

[11] Patent Number: 6,080,303
[45] Date of Patent: Jun. 27, 2000

[54] ZEOLITE CATALYST ACTIVITY ENHANCEMENT BY ALUMINUM PHOSPHATE AND PHOSPHORUS

[75] Inventors: Guang Cao, Branchburg, N.J.; Luc R. M. Martens, Meise, Belgium; Jeffrey L. White; Tan-Jen Chen, both of Kingwood, Tex.; Matu J. Shah, Livingston, N.J.

[73] Assignee: Exxon Chemical Patents, Inc., Houston, Tex.

[21] Appl. No.: 09/038,649

[22] Filed: Mar. 11, 1998

[51] Int. Cl.$^7$ .................................................. C10G 11/05
[52] U.S. Cl. .................. 208/120.01; 208/113; 208/114; 502/60; 502/64; 502/67; 502/71; 502/77
[58] Field of Search .............................. 208/120.01, 113, 208/114; 502/60, 64, 67, 71, 77

[56] References Cited

U.S. PATENT DOCUMENTS

| | | | |
|---|---|---|---|
| 3,354,096 | 11/1967 | Young | 252/435 |
| 3,702,886 | 11/1972 | Arganer et al. | 423/328 |
| 3,709,979 | 1/1973 | Chu et al. | 423/328 |
| 3,846,337 | 11/1974 | Young | 252/437 |
| 3,972,832 | 8/1976 | Butter et al. | 252/437 |
| 4,228,036 | 10/1980 | Swift et al. | 252/437 |
| 4,454,241 | 6/1984 | Pine et al. | 502/68 |
| 4,456,780 | 6/1984 | Young | 585/475 |
| 4,567,152 | 1/1986 | Pine | 502/64 |
| 4,605,637 | 8/1986 | Chang et al. | 502/64 |
| 4,760,040 | 7/1988 | Sato et al. | 502/68 |
| 4,765,884 | 8/1988 | Walker et al. | 208/89 |
| 4,803,185 | 2/1989 | Miller et al. | 502/65 |
| 4,839,319 | 6/1989 | Schuette et al. | 502/64 |
| 4,873,211 | 10/1989 | Walker et al. | 502/64 |
| 4,977,122 | 12/1990 | Eberly | 502/69 |
| 5,110,776 | 5/1992 | Chitnis et al. | 502/64 |
| 5,171,921 | 12/1992 | Gaffney et al. | 585/653 |
| 5,194,412 | 3/1993 | Roberie et al. | 502/64 |
| 5,312,792 | 5/1994 | Roberie | 502/60 |
| 5,366,948 | 11/1994 | Absil et al. | 502/68 |
| 5,378,670 | 1/1995 | Kumar | 502/60 |
| 5,380,690 | 1/1995 | Zhicheng et al. | 502/65 |
| 5,457,078 | 10/1995 | Absil et al. | 502/68 |
| 5,470,810 | 11/1995 | Degnan et al. | 502/64 |
| 5,601,699 | 2/1997 | Degnan et al. | 208/114 |

FOREIGN PATENT DOCUMENTS

| | | |
|---|---|---|
| 496226A1 | 7/1992 | European Pat. Off. . |
| WO 99/02260 | 1/1999 | WIPO . |

OTHER PUBLICATIONS

Seo, et al., "$^{31}$P, $^{27}$Al, and $^{129}$Xe NMR Study of Phosphorus–Impregnated HZSM–5 Zeolite Catalysts", Journal of Catalysis, vol. 124, pp. 224–230, (1990).

Lischke, et al., "Spectroscopic and Physicochemical Characterization of P–Modified H–ZSM–5", Journal of Catalysis, vol. 132, pp. 229–243, (1991).

*Primary Examiner*—Thomas Dunn
*Attorney, Agent, or Firm*—James A. Zboray

[57] ABSTRACT

The present invention provides a process for improving the catalytic activity of small and medium pore acidic zeolite catalyst which comprises the steps of treating a zeolite with a phosphorus compound to form a phosphorus treated zeolite and combining the phosphorus treated zeolite with $AlPO_4$. Optionally the phosphorus treated zeolite is calcined. The step of combining the zeolite with $AlPO_4$ may optionally be followed by steaming the combined catalyst. Examples of useful phosphorus containing compounds useful in treating the zeolite include phosphoric acid, ammonium mono or dihydrogen phosphate, organic phosphites, and organophosphines. Preferably the phosphorus containing compound is an ammonium acid phosphate. An additional alternate embodiment provides a process for increasing the hydrothermal stability of a zeolite catalyst which comprises first treating a zeolite with a phosphorus containing compound then blending with $AlPO_4$. The catalyst of the invention may be combined with other catalysts or used alone. The invention may be used in a process for cracking hydrocarbons which comprises contacting a hydrocarbon feedstock with a catalyst prepared as described above.

50 Claims, No Drawings

ZEOLITE CATALYST ACTIVITY ENHANCEMENT BY ALUMINUM PHOSPHATE AND PHOSPHORUS

TECHNICAL FIELD

The invention provides a process for increasing activity and hydrothermal stability of zeolite catalysts by the addition of aluminum phosphate and phosphorus to small and medium pore acidic zeolites.

BACKGROUND

Thermal and catalytic conversion of hydrocarbons to olefins is an important industrial process producing millions of pounds of olefins each year. Because of the large volume of production, small improvements in operating efficiency translate into significant profits. Catalysts play an important role in more selective conversion of hydrocarbons to olefins.

Particularly important catalysts are found among the natural and synthetic zeolites. Zeolites are crystalline aluminosilicates with a network of $AlO_4$ and $SiO_4$ tetrahedra linked by oxygen atoms. The negative charge of the network is balanced by the inclusion of protons or cations such as alkali or alkaline earth metal ions. The interstitial spaces or channels formed by the crystalline network enable zeolites to be used as molecular sieves in separation processes and in catalysis. There are a large number of both natural and synthetic zeolitic structures including materials with additional elements such as boron, iron, gallium and titanium. The wide breadth of zeolite structures is illustrated in the "Atlas of Zeolite Structure Types" by W. M. Meier, D. H. Olson and Ch. Baerlocher (4th ed., Elsevier/Intl. Zeolite Assoc. (1996)). Catalysts containing zeolites, especially medium pore zeolites, are known to be active in cracking light naphtha to light olefins, primarily propylene and butylenes, as well as heavier hydrocarbon streams.

Of particular interest are the proton form zeolites effective for conversion of hydrocarbons such as naphthas to olefins. Typical catalysts include ZSM-5 zeolite described and claimed in U.S. Pat. No. 3,702,886, and ZSM-11 described in U.S. Pat. No. 3,709,979, and the numerous variations on these catalysts disclosed and claimed in later patents. It has previously been observed that treatment or addition of either phosphorus or aluminum phosphate separately produced a small improvement in certain zeolite catalysts. U.S. Pat. No. 4,605,637 teaches activation of low acidity zeolite with an aluminum phosphate in contact with an aqueous liquid phase. U.S. Pat. No. 4,977,122 teaches use of phosphorus containing alumina to increase the activity of catalysts. U.S. Pat. No. 5,378,670 discloses use of phosphorus compounds to activate zeolites. U.S. Pat. No. 5,457,078 teaches a method for manufacture of improved zeolite beta catalyst wherein a matrix substantially free of crystalline aluminum phosphate is generated by treating the zeolite and a source of acid soluble source of aluminum such as pseudoboehmite with a phosphorus compound such as phosphoric acid. The resulting mixture is spray dried or extruded and may optionally be calcined. In one example ZSM-5 is used. However the composition is specifically described and claimed as a matrix that is substantially free of crystalline aluminum phosphate.

The art has not previously recognized the synergistic effect of phosphorus and aluminum phosphate in combination with small and medium pore acidic zeolites. In contrast to the teaching of U.S. Pat. No. 5,457,078, which taught the use of a catalyst substantially free of crystalline aluminum phosphate, the present inventors found that a combination including aluminum phosphate and phosphorus treated medium and small pore acidic zeolites provide a synergistically improved cracking catalyst with improvements significantly larger than the sum of improvements noted with either component alone.

SUMMARY

The present invention provides a process for improving the catalytic activity and hydrothermal stability of small and medium pore acidic zeolite catalyst which comprises the steps of treating a zeolite with a phosphorus compound to form a phosphorus treated zeolite and combining the phosphorus treated zeolite with $AlPO_4$. Optionally the phosphorus treated zeolite is calcined. The step of combining the zeolite with $AlPO_4$ may optionally be followed by steaming the combined catalyst. Examples of phosphorus containing compounds useful in treating the zeolite include phosphoric acid, or an acidic salt thereof such as ammonium mono or dihydrogen phosphate, organic phosphites, and organic phosphines. Preferably the phosphorus containing compound is an ammonium acid phosphate. Any of the naturally occurring or synthetic crystalline medium pore and small pore zeolites may be improved by treatment according to the invention. These zeolites and their isotypes are described in the "Atlas of Zeolite Structure Types", eds. W. H. Meier, D. H. Olson, and Ch. Baerlocher, Elsevier, Fourth Edition, 1996, which is incorporated by reference.

A medium pore size zeolite generally has a pore size from about 5 Å to about 7 Å and includes for example, MFI, MEL, MTW, EUO, MTT, FER, MFS, and TON structure type zeolites [using the nomenclature of the International Union of Pure and Applied Chemistry (IUPAC) Commission of Zeolite Nomenclature]. Examples of medium pore size zeolites, which correspond to the structure types listed above, include ZSM-5, ZSM-11, ZSM-22, ZSM-23, ZSM-34, ZSM-35, ZSM-38, ZSM-48, ZSM-50, ZSM-57, MCM-22, silicalite-1, and silicalite-2.

A small pore zeolite has a pore size from about 3X up to 5X and includes for example, CHA, ERI, MAZ, OFF, RHO, HEV, KFI, LEV, and LTA structure type zeolites (IUPAC Commission of Zeolite Nomenclature). Examples of small pore zeolites include ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

In a preferred embodiment the zeolite catalyst comprises ZSM-5. An alternate embodiment provides a process for increasing the catalytic activity of a zeolite catalyst which comprises first treating a zeolite with a phosphorus containing compound then blending with $AlPO_4$. In an alternate embodiment the invention is a catalyst having a composition of 0.5–10%P/1–50% $AlPO_4$/5–60% zeolite/ and the remaining quantity to provide 100%, if any, being a binder material. The binder may be any suitable material. Preferably the binder is selcted from the group consisting of kaolin, silica, alumina or mixed oxides; preferably the composition is 1–2%P/3–5% $AlPO_4$/35–55% zeolite/38–61% binder more preferably 1%P/4% $AlPO_4$/40% zeolite/55% binder. The catalyst of the invention may be combined with other catalysts or used alone.

The invention may be used in a process for cracking hydrocarbons which comprises contacting a hydrocarbon feedstock with a catalyst prepared as described above under catalytic cracking conditions. Alternatively the invention provides an method for improving the stability of a catalyst over time compared to an untreated zeolite catalyst of the same type.

DETAILED DESCRIPTION OF THE INVENTION

Examples of medium and small pore zeolites useful in the claimed process include gallium silicate, zeolite rho, ZK5, titanosilicate, ferrosilicate, borosilicate zeolites, or naturally occurring crystalline zeolites such as chabazite, erionite, mazzite, offretite, gmelinite, etc.

Suitable catalysts for treatment according to the invention are found among the medium and small pore zeolites. As used herein, medium and small pore zeolites also include zeolites having respectively 10 or 8 membered pore structures. These zeolites may be produced with differing silica to alumina molar ratios ranging from 2:1 upwards. They have been, in fact, produced from reaction mixtures from which alumina is intentionally excluded, so as to produce materials having extremely high silica to alumina ratios which, in theory at least, may extend up to infinity, prior to treatment according to the invention. Preferred medium pore zeolites include ZSM-5, ZSM-11, ZSM-22, ZSM -23, ZSM-35, ZSM-48 and MCM-22. Particularly preferred is ZSM-5. Preferred small pore zeolites, include such crystalline aluminosilicate zeolites as erionite, chabazite, ferrierite, heulandite, and such synthetic counterparts thereof as zeolites A and ZK5.

Preferably zeolites have a silica to alumina ratio within the range of about 2.0:1 to 2000:1. More preferably, the zeolite catalyst has a structure type selected from the group consisting of MFI, MEL, MTW, EUO, MTT, FER, MFS, TON, CHA, ERI, MAZ, OFF, RHO, HEV, KFI, LEV, and LTA. In a preferred alternative, the zeolites to be treated are selected from the group consisting of ZSM-5, ZSM-11, ZSM-22, ZSM-23, ZSM-34, ZSM-35, ZSM-38, ZSM-48, ZSM-50, ZSM-57, MCM-22, silicalite-1, silicalite-2, ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho. An especially favored zeolite is ZSM-5.

The phosphorus may be added to the zeolite by any conventional means such as blending the zeolite with an aqueous solution of a phosphorus compound such as a phosphate salt or phosphoric acid. Ammonium acid phosphates are preferred sources of phosphorus. Following treatment with the phosphorus solution the zeolite may be calcined prior to combining with dry or wet aluminum phosphate gel or the aluminum phosphate may be formed in situ as by treatment of an aluminum compound such as alumina and the zeolite with a suitable phosphorus containing reagent such as a phosphate solution. The order of blending is important with the phosphorus treatment occurring before addition of the aluminum phosphate. In preferred embodiments the catalyst also includes a binder such as silica, alumina or clay. The enhanced phosphorus treated zeolite/aluminum phosphate catalyst may be used alone or blended with another catalyst to achieve the desired degree of improved conversion. For instance the phosphorus treated zeolite/aluminum phosphate catalyst with or without a binder may be added to a fluid catalytic cracking catalyst bed in combination with a conventional FCC catalyst to improve conversion in the unit. In another embodiment the invention also provides a method for phosphorus treating a zeolite that when combined with an aluminum phosphate produces a catalyst also exhibits improved hydrothermalstability relative to an untreated zeolite catalyst of the same type in a mixture with the same quantity of aluminum phosphate.

Suitable hydrocarbons when practicing the present invention would include any feedstock typically feeding catalytic crackers. Examples are butane, naphthas, gasoils, Fischer-Tropsch liquids, raffinates, field natural gasolines, petrolem waxes, and vacuum gasoil. Additional suitable feedstocks include streams containing olefins or diolefins such as butenes, butadienes, steam cracked naphthas, cat cracked naphthas, coker naphthas. Preferred hydrocarbons are light virgin naphthas, light cat naphtha, unhydrogenated $C_4$ to $C_6$ compounds from normal steam cracker effluent, vacuum resids, or portions of the effluent from a catalytic cracker as a recycle.

When the catalyst is used in a process for cracking hydrocarbons the temperature in the catalytic reactor is optimized to achieve the desired different ratios of products such as ethylene or propylene as desired, with a normal operating temperature range in the range of about 500° C. to 750° C.; more preferably in the range of 500° C. to 650° C.; most preferably in the range of 500° C. to 600° C. The catalyst contacting process is preferably carried out at a weight hourly space velocity (WHSV) in the range of about 0.1 $Hr^{-1}$ WHSV to about 300 $Hr^{-1}$ WHSV, more preferably in the range of about 10 $Hr^{-1}$ WHSV to about 300 $Hr^{-1}$ WHSV, and most preferably in the range of about 20 $Hr^{-1}$ WHSV to about 30 $Hr^{-1}$ WHSV. The pressure may range from below atmospheric pressure to 100 psig or more.

The cracking process may be carried out in any cracking vessel such as a fluid catalytic cracker, a moving bed cracker, a fluidized bed or a transfer line. The hydrocarbon flow maybe either co-current or counter current. The coked catalyst may be regenerated and returned to the process vessel, or the process may be run as a batch process. The process of the invention may also be carried out in a fixed bed cracker and the catalyst may be regenerated in situ. As used herein "catalytic cracking conditions" includes a reaction carried out in any of the preceding systems.

EXAMPLE 1

Preparation of Aluminum Phosphate

In a 100 ml round bottom flask 15.00 g of $Al(NO_3)_3 \cdot 5 H_2O$ were dissolved in approximately 20 ml of water. In the aluminum nitrate solution 4.60 g of $NH_4H_2PO_4$ were dissolved. To the mechanally stirred solution concentrated $NH_4OH$ (28–30 wt %)was added dropwise (0.1 ml/min.) until a gel forms, pH 6–7. The stirred gel is connected to a flask containing 20 ml concentrated $NH_4OH$ and stirring maintained overnight with the $NH_4OH$ flask being heated at 50° C. This apparatus allows the gel to age under an ammonia atmosphere. The $AlPO_4$ was dried at 70° C. in a vacuum oven, then calcined at 500° C. for one hour in air.

EXAMPLE 2

Phosphorus Treated Zeolite Blend with dry $AlPO_4$

To a slurry of 5.0 g ZSM-5 zeolite with the minimum amount of water needed to form a slurry were added 0.46 g $NH_4H_2PO_4$. The treated zeolite was dried at 70° C. in a vacuum oven. To the dried zeolite, 0.50 g of $AlPO_4$ was added with just enough water to make a slurry. The mixture was dried in a vacuum oven at 70° C. and 85 kPa. The dried mixture is mixed well with 13.27 ml of Ludox AS-40, then dried at 70° C. at about 85 kPa. The catalyst was ion exchanged with $NH_4$ three times at 80° C. with 60 ml of a 5 wt % aqueous solution of $NH_4Cl$ and washed until chloride free by the $AgNO_3$ test. The dried catalyst was pelletized under 12 tons pressure, and crushed to 60–100 mesh. The resulting catalyst composition was 1%P/4%$AlPO_4$/40%ZSM-5/55% $SiO_2$.

The same procedure with suitable adjustment of proportions was used to produce a series of catalysts with the composition 0–1%P/0–8% AlPO$_4$/40% zeolite/ 51–60%SiO$_2$.

EXAMPLE 3

Phosphorus Treated Zeolite with Wet Gel AlPO$_4$

A solution of 18.5 g NH$_4$H$_2$PO$_4$ in 120 ml of water is used to wet 200 g NH$_4$ZSM-5 to incipient wetness. The sample was vacuum dried at 70° C. and then calcined at 500° C. for one hour. The calcined solid was blended until uniform with AlPO$_4$ produced by dissolving 58.4 g Al(NO$_3$)$_3$·9H$_2$O and 17.9 g NH$_4$H$_2$PO$_4$ in 155 g of H$_2$O, followed by the addition of 20–24 g concentrated NH$_4$OH while the mixture was vigorously blended to a final pH in the range of 7–9. The mixture was placed in a closed vessel over NH$_4$OH solution at 40° C. overnight to age the gel, then dried. The dried mixture was blended with 580 g of Ludox AS-40 (a silica sol) and dried. The dried catalyst was exchanged with 5% NH$_4$Cl (w/w) aqueous solution three time and washed until chloride free by testing with AgNO$_3$. The solid is dried, then calcined at 500° C. for 6 hours, followed by an additional NH$_4$Cl exchange (3 times) washing until chloride free, and drying the catalyst. The presence of aluminum phosphate formation in the catalyst was confirmed by MAS-NMR spectroscopy.

EXAMPLE 4

In Situ AlPO$_4$ Formation

A zeolite catalyst with in situ aluminum phosphate was prepared by blending finely ground aluminum acetoacetonate with ZSM-5 (either with or without alumina) in sodium free silica sol Ludox AS40. The vigorously stirred blend was dried on a hot plate. The resulting mass was further dried in vacuum at 80° C. The vacuum dried product was heated under flowing nitrogen to 150° C. and held for one hour, then heated to 500° C. and held for one hour. The heating was continued with air flow for two hours to burn away any residual carbon. The calcined catalyst was treated with NH$_4$H$_2$PO$_4$ solution to obtain the desired phosphorus content. The formation of aluminum phosphate in the catalyst with alumina was confirmed by MAS-NMR spectroscopy.

EXAMPLE 5

N-Hexane Cracking With Wet Gel And Dry Blend Catalysts

Catalysts prepared as in Examples 2 (Dry) and 3 (Wet Gel) were used in a model system to crack undiluted n-hexane. A series of runs in a small bench reactor was conducted on n-hexane model compound. Prior to the cracking tests, the catalyst was steamed with 100% steam at 704° C. and 1 atmosphere for 16 hours for the purpose of aging the catalyst. A first run was conducted at 650 ° C., 31 Hr$^{-1}$ WHSV over a fixed bed of 0.6 g of the selected zeolite catalyst. The effluent stream was analyzed by on-line gas chromatography. A column having a length of 60 m packed with fused silica was used for the analysis. The gas chromatograph used was a dual flame ionization detection (FID) Hewlett-Packard Model 5880.

The results are shown in Table 1 below:

TABLE 1

| CATALYST: | H-ZSM-5 | P-ZSM-5 | PAL-ZSM-5 (Wet Gel, Ex. 3) | PAL-ZSM-5 (Dry, Ex. 2) |
|---|---|---|---|---|
| n-Hexane Conversion, Wt % | 20.3 | 19.5 | 56.0 | 71.1 |
| Key Products Wt % | | | | |
| Ethylene | 5.3 | 5.3 | 8.8 | 11.5 |
| Propylene | 5.1 | 4.8 | 18.5 | 20.4 |
| Butenes | 3.5 | 3.3 | 8.8 | 9.7 |
| Aromatics | 0.0 | 0.0 | 0.6 | 2.5 |
| Light Saturates | 4.7 | 4.5 | 17.1 | 23.4 |

EXAMPLE 6

Cracking with Steam Co-Feed

A run conducted as in example 5 using the catalyst prepared as in Example 3. In this test run, the steam to hydrocarbon weight ratio was 0.33. The results are shown in Table 2 below:

TABLE 2

| CATALYST: | H-ZSM-5 | PAL-ZSM-5 (Wet Gel, Ex. 3) |
|---|---|---|
| Hexane Conversion, Wt % | 8.3 | 44.2 |
| Key Products Wt % | | |
| Ethylene | 2.0 | 5.6 |
| Propylene | 2.0 | 16.3 |
| Butenes | 1.6 | 8.5 |
| Aromatics | 0.0 | 0.1 |
| Light Saturates | 1.6 | 12.4 |

EXAMPLE 7

Cracking of Butadiene-Hexane Model Compounds

A run was conducted as in Example 5 with butadiene/hexane diluted 16/1 with steam (6/1) and nitrogen (10/1) at 680° C. 5 Hr$^{-1}$ WHSV , the results are shown in Table 3:

TABLE 3

| CATALYST: | H-ZSM-5 | PAL-ZSM-5 (Wet gel, Ex. 3) | PAL-ZSM-5 (Dry, Ex. 2) |
|---|---|---|---|
| Overall Conversion, Wt % | 23.9 | 86.4 | 98.8 |
| Butadiene Conversion, Wt % | 46.1 | 100.0 | 100.0 |
| Hexane Conversion, Wt % | 9.9 | 77.8 | 98.0 |
| Key Products Wt % | | | |
| Ethylene | 3.2 | 14.7 | 23.0 |
| Propylene | 6.7 | 29.3 | 28.8 |
| Butenes | 1.7 | 8.5 | 5.9 |
| Aromatics | 7.2 | 18.9 | 24.0 |
| Light Saturates | 1.6 | 14.0 | 16.3 |

EXAMPLE 8

Comparative Examples Showing Synergism of Phosphorus Treatment and AlPO$_4$ Addition Ammonium ZSM-5 treated with NH$_4$H$_2$PO$_4$ was blended with fresh AlPO$_4$ prepared as in Example 1 and combined with Ludox AS40 as in Example 3, to produce a series of catalyst samples having various phosphorus loading and amounts of AlPO$_4$. The catalysts were tested as in Example 5 with steaming for 8 hours at 700° C., run at 650° C., 4 hr$^{-1}$ WHSV, and the results are setout in Table 4 below, showing catalyst composition giving the percentage of P, AlPO$_4$ and zeolite, the remainder being silica. The table reports n-hexane conversion in weight %.

TABLE 4

| Catalyst Composition | | | | | | | | |
|---|---|---|---|---|---|---|---|---|
| % P | 0 | 1 | 0 | 0 | 0 | 1 | 1 | 1 |
| % AlPO$_4$ | 0 | 0 | 4 | 6 | 8 | 4 | 6 | 8 |
| % ZSM-5 | 40 | 40 | 40 | 40 | 40 | 40 | 40 | 40 |
| n-hexane conversion in Wt. %: | 15 | 22 | 30 | 22 | 20 | 100 | 79 | 87 |

EXAMPLE 9

In Situ Formed AlPO$_4$ Catalysts

A series of runs with catalysts prepared according to Example 4 were carried out as in Example 5 with n-hexane at 650° C., 2$^{-1}$ WHSV. The results are reported in Table 5 for catalysts with no alumina, 40% ZSM-5 and 60% silica and 4% alumina, 40%ZSM-5 and 56% silica. The table reports n-hexane conversion in weight %.

TABLE 5

| | without alumina | | | | | With Alumina (in situ AlPO$_4$) | | | | | |
|---|---|---|---|---|---|---|---|---|---|---|---|
| % P | 0 | 1.0 | 2.0 | 3.0 | 4.0 | 0.5 | 1.0 | 1.5 | 2.0 | 2.5 | 4.0 |
| n-hexane conversion in Wt. %: | 27 | 28 | 55 | 28 | 29 | 58 | 62 | 94 | 95 | 100 | 66 |

EXAMPLE 10

Lower Temperature Cracking

A series of catalysts were prepared by first loading 2% P on an ammonium ZSM-5 with a Si/Al ratio of 27 by impregnating the zeolite with aqueous NH$_4$H$_2$PO$_4$ followed by calcination at 500° C. for one hour as in Example 2. The divided product was mixed with wet gel prepared as in example 1 to produce batches containing 10%, 15% and 20% AlPO$_4$ based on zeolite. The mixture was aged over NH$_4$OH solution in a closed vessel at 40° C. overnight. The solid was then blended with Ludox AS40 and was dried. The zeolite content in the mixture was 40% on a dry weight basis. The catalyst was exchanged 3 times against 5% aqueous NH$_4$Cl and washed until chloride free by the AgNO$_3$ test. The catalysts were steamed at 700° C. for 16 hours, and tested against n-hexane as in Example 5 at 450° C., 30 hr$^{-1}$ WHSV without diluent. The results are reported in Table 6.

TABLE 6

| % AlPO$_4$: | 0 | 10 | 15 | 20 |
|---|---|---|---|---|
| n-Hexane conversion, Wt % | 36.8 | 52.6 | 50.5 | 46.7 |

We claim:
1. A process for improving the catalytic activity of small and medium pore acidic zeolite catalysts which comprises the steps of treating at least one small or medium pore acidic zeolite with a phosphorus compound to form a phosphorus treated zeolite and combining the phosphorus treated zeolite with AlPO$_4$.

2. The process of claim 1 where the phosphorus compound is selected from the group consisting of ammonium acid phosphate, ammonium dihydrogen phosphate, phosphoric acid or an acidic salt thereof, polyphosphoric acid or an acidic salt thereof, an organic phosphite, and an organophosphine.

3. The process of claim 1 where the zeolite treated with a phosphorus compound comprises a structure type selected from the group consisting of MFI, MEL, MTW, EUO, MTT, FER, MFS, TON, CHA, ERI, MAZ, OFF, RHO, HEV, KFI, LEV, and LTA.

4. The process of claim 1 wherein a zeolite to be treated with phosphorus is selected from the group consisting of ZSM-5, ZSM-11, ZSM-22, ZSM-23, ZSM-34, ZSM-35, ZSM-38, ZSM-48, ZSM-50, ZSM-57, MCM-22, silicalite-1, silicalite-2, ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

5. The process of claim 1 wherein a zeolite to be treated with phosphorus has a 10 membered ring structure.

6. The process of claim 1 wherein a zeolite to be treated has an 8 membered ring structure.

7. The process of claim 1 wherein a zeolite to be treated with phosphorus is selected from the structural types consisting of MFI, MEL, MTW, EUO, MTT, FER, MFS, and TON.

8. The process of claim 1 wherein a zeolite to be treated with phosphorus is selected from the structural types consisting of CHA, ERI, MAZ, OFF, RHO, HEV, KFI, LEV, and LTA.

9. The process of claim 1 wherein a zeolite to be treated with phosphorus is selected from the group consisting of ZSM-5, ZSM-11, ZSM-22, ZSM-23, ZSM-34, ZSM-35, ZSM-38, ZSM-48, ZSM-50, ZSM-57, MCM-22, silicalite-1, and silicalite-2.

10. The process of claim 1 wherein a zeolite to be treated with phosphorus is selected from the group consisting of ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

11. The process of claim 4 wherein the zeolite catalyst comprises ZSM-5.

12. The process of claim 1 wherein the catalyst composition is 0.5–10% P.

13. The process of claim 1 wherein the catalyst composition is 1–50% AlPO$_4$.

14. The process of claim 1 wherein the catalyst composition is 5–60% zeolite.

15. The process of claim 1 wherein the catalyst composition is 0.5–10% P/1–50% AlPO$_4$/5–60% zeolite and the remaining quantity to provide 100%, if any, being a binder material.

16. The process of claim 8 wherein the binder material is selected from the group consisting of kaolin, silica, alumina, or mixed oxides.

17. The process of claim 8 wherein the catalyst has the composition of about 1%P/4% AlPO$_4$/40% zeolite/55% SiO$_2$.

18. A process according to claim 1 which comprises combining a small or medium pore acidic zeolite with an aluminum compound and treating the mixture with a phosphorus compound to form a phosphorus treated zeolite and AlPO$_4$.

19. A process according to claim 1 wherein $AlPO_4$ is selected from the group consisting of a freshly prepared wet gel, a dried and calcined dry gel, or $AlPO_4$ formed from treating an aluminum compound mixed with the phosphorus treated zeolite.

20. A process according to claim 1 wherein the process comprises a first step of treating the zeolite with a phosphorus compound, calcining the phosphorus treated zeolite and combining the calcined phosphorus treated zeolite with $AlPO_4$.

21. The process of claim 1 wherein the combined phosphorus treated zeolite and $AlPO_4$ are steamed.

22. A process for cracking a hydrocarbon that comprises contacting a hydrocarbon feedstock under catalytic cracking conditions with a catalyst that comprises the catalyst of claim 1.

23. A process according to claim 22 wherein the feed stock is selected from the group consisting of, butane, naphthas, gasoils, Fischer-Tropsch liquids, raffinates, field natural gasolines, petroleum, waxes, vacuum gasoils, olefins, diolefins, butenes, butadienes, steam cracked naphthas, cat cracked naphthas, coker naphthas, light virgin naphthas, light cat naphtha, unhydrogenated $C_4$ to $C_6$ compounds from normal steam cracker effluent, vacuum resids, and effluent from a catalytic cracker.

24. A process according to claim 22 wherein the feed stock is selected from the group consisting of light virgin naphthas, light cat naphtha, coker naphthas, unhydrogenated $C_4$ or $C_6$ compounds from normal steam cracker effluent, and effluent from a catalytic cracker.

25. A process according to claim 22 wherein the catalyst is added to the catalyst bed of a fluidized catalytic cracker in an amount sufficient to enhance production of propylene or butylene.

26. A process according to claim 22 wherein the feed comprises naphtha.

27. A process according to claim 22 wherein the naphtha is selected from the group consisting of saturated virgin naphthas, catalytically cracked naphthas, coker naphthas, and steam cracked naphthas.

28. A composition of matter prepared according to the process of claim 1.

29. A process for enhancing the hydrothermal stability of a small or medium pore acidic zeolite catalyst which comprises the steps of treating at least one small or medium pore acidic zeolite with a phosphorus compound to form a phosphorus treated zeolite and combining the phosphorus treated zeolite with $AlPO_4$.

30. The process of claim 29 where the phosphorus compound is selected from the group consisting of ammonium acid phosphate, ammonium dihydrogen phosphate, phosphoric acid or an acidic salt thereof, polyphosphoric acid or an acidic salt thereof, an organic phosphite, and an organophosphine.

31. The process of claim 29 where the zeolite treated with a phosphorus compound comprises a structure type selected from the group consisting of MFI, MEL, MTW, EUO, MTT, FER, MFS, TON, CHA, ERI, MAZ, OFF, RHO, HEV, KFI, LEV, and LTA.

32. The process of claim 29 wherein a zeolite to be treated with phosphorus is selected from the group consisting of ZSM-5, ZSM-11, ZSM-22, ZSM-23, ZSM-34, ZSM-35, ZSM-38, ZSM-48, ZSM-50, ZSM-57, MCM-22, silicalite-1, silicalite-2, ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

33. The process of claim 29 wherein a zeolite to be treated with phosphorus has a 10 member ring structure.

34. The process of claim 29 wherein a zeolite to be treated has an 8 membered ring structure.

35. The process of claim 29 wherein a zeolite to be treated with phosphorus is selected from the structural types consisting of MFI, MEL, MTW, EUO, MTT, FER, MFS, and TON.

36. The process of claim 29 wherein a zeolite to be treated with phosphorus is selected from the structural types consisting of CHA, ERI, MAZ, OFF, RHO, HEV, KFI, LEV, and LTA.

37. The process of claim 29 wherein a zeolite to be treated with phosphorus is selected from the group consisting of ZSM-5, ZSM-11, ZSM-22, ZSM-23, ZSM-34, ZSM-35, ZSM-38, ZSM-48, ZSM-50, ZSM-57, MCM-22, silicalite-1, and silicalite-2.

38. The process of claim 29 wherein a zeolite to be treated with phosphorus is selected from the group consisting of ZK-4, SAPO-34, SAPO-35, ZK-14, SAPO-42, ZK-21, ZK-22, ZK-5, ZK-20, zeolite A, erionite, chabazite, zeolite T, gmelinite, ALPO-17, clinoptilolite, mazzite, offretite, heulandite and zeolite rho.

39. The process of claim 29 wherein the zeolite catalyst comprises ZSM-5.

40. The process of claim 29 wherein the catalyst composition is 0.5–10% P.

41. The process of claim 29 wherein the catalyst composition is 1–50% $AlPO_4$.

42. The process of claim 29 wherein the catalyst composition is 5–60% zeolite.

43. The process of claim 29 wherein the catalyst composition is 0.5–10% P/1–50% $AlPO_4$/5–60% zeolite and the remaining quantity to provide 100%, if any, being a binder material selected from the group consisting of kaolin, silica or alumina.

44. The process of claim 29 wherein the catalyst has the composition of about 1%P/4% $AlPO_4$/40% zeolite/55% $SiO_2$.

45. A process according to claim 29 wherein $AlPO_4$ is selected from the group consisting of a freshly prepared wet gel, a dried and calcined dry gel, or $AlPO_4$ formed from treating an aluminum compound mixed with the zeolite and subsequently treated with phosphorus.

46. A process according to claim 29 wherein the process comprises a first step of treating the zeolite with a phosphorus compound, calcining the phosphorus treated zeolite and combining the calcined phosphorus treated zeolite $AlPO_4$.

47. The process of claim 29 wherein the combined phosphorus treated zeolite and $AlPO_4$ are steamed.

48. A composition of matter which comprises 0.5–10% P/1–50% $AlPO_4$/5–60% zeolite and the remaining quantity to provide 100%, if any, being a binder material, the composition being formed by treatment of a medium or small pore acidic zeolite with a phosphorus compound the zeolite being also mixed with $AlPO_4$.

49. The composition of claim 48 of about 1%P/4% $AlPO_4$/40% zeolite/55% $SiO_2$.

50. The composition of claim 48 wherein the binder material is selected from the group consisting of kaolin, silica, alumina, or mixed oxides.

* * * * *